(12) United States Patent
Meyer et al.

(10) Patent No.: US 9,822,003 B2
(45) Date of Patent: Nov. 21, 2017

(54) PROCESS AND APPARATUS FOR MOLTEN SLAG GASIFICATION OF SOLID FUELS

(71) Applicant: Envirotherm GmbH, Essen (DE)

(72) Inventors: Bernd Meyer, Freiberg (DE); Martin Gräbner, Freiberg (DE)

(73) Assignee: Envirotherm GmbH, Essen (DE)

( * ) Notice: Subject to any disclaimer, the term of this patent is extended or adjusted under 35 U.S.C. 154(b) by 372 days.

(21) Appl. No.: 14/378,511

(22) PCT Filed: Feb. 13, 2013

(86) PCT No.: PCT/EP2013/052876
§ 371 (c)(1),
(2) Date: Aug. 13, 2014

(87) PCT Pub. No.: WO2013/120901
PCT Pub. Date: Aug. 22, 2013

(65) Prior Publication Data
US 2015/0014594 A1    Jan. 15, 2015

(30) Foreign Application Priority Data

Feb. 13, 2012    (DE) .................. 10 2012 202 143

(51) Int. Cl.
| C01B 3/38 | (2006.01) |
| C01B 3/02 | (2006.01) |
| C10J 3/08 | (2006.01) |
| C10J 3/16 | (2006.01) |
| C10B 49/02 | (2006.01) |

(52) U.S. Cl.
CPC ............... *C01B 3/02* (2013.01); *C10B 49/02* (2013.01); *C10J 3/08* (2013.01); *C10J 3/16* (2013.01); *C10J 2300/093* (2013.01); *C10J 2300/0959* (2013.01); *C10J 2300/0976* (2013.01)

(58) Field of Classification Search
CPC ........ C01B 3/02; C10J 3/08; C10J 3/16; C10J 2300/093; C10B 49/02
See application file for complete search history.

(56) References Cited

FOREIGN PATENT DOCUMENTS

| DE | 886363 C | 8/1953 |
| DE | 1071265 B | 12/1959 |
| DE | 10343582 A1 | 5/2005 |
| DE | 102006041838 A1 | 3/2008 |
| DE | 10-2007-006-979 B4 | 9/2009 |
| EP | 0000442 A1 | 1/1979 |
| WO | WO-03-006585 A1 | 1/2003 |

*Primary Examiner* — Paul Wartalowicz
(74) *Attorney, Agent, or Firm* — Harness, Dickey & Pierce, P.L.C.

(57) ABSTRACT

A process and an apparatus for molten slag gasification of solid fuels in a molten slag gasifier with increased output, an increased range of solid fuels that can be used and improved gas quality. The process is conducted such that, by means of a molten slag gasifier comprising a feed of the coarse-grained solid fuels and comprising a gas takeoff, both at the head of the molten slag gasifier, comprising a slag bath and comprising a slag bath takeoff at the bottom of the molten slag gasifier, comprising a feed for first gasifying means by means of gasifying means nozzles above the slag bath, comprising a filling of the fixed bed above the slag bath, in addition to the first gasifying means a second gasifying means are injected by way of at least one gasifying means nozzle that reaches into the upper region of the fixed bed.

5 Claims, 1 Drawing Sheet

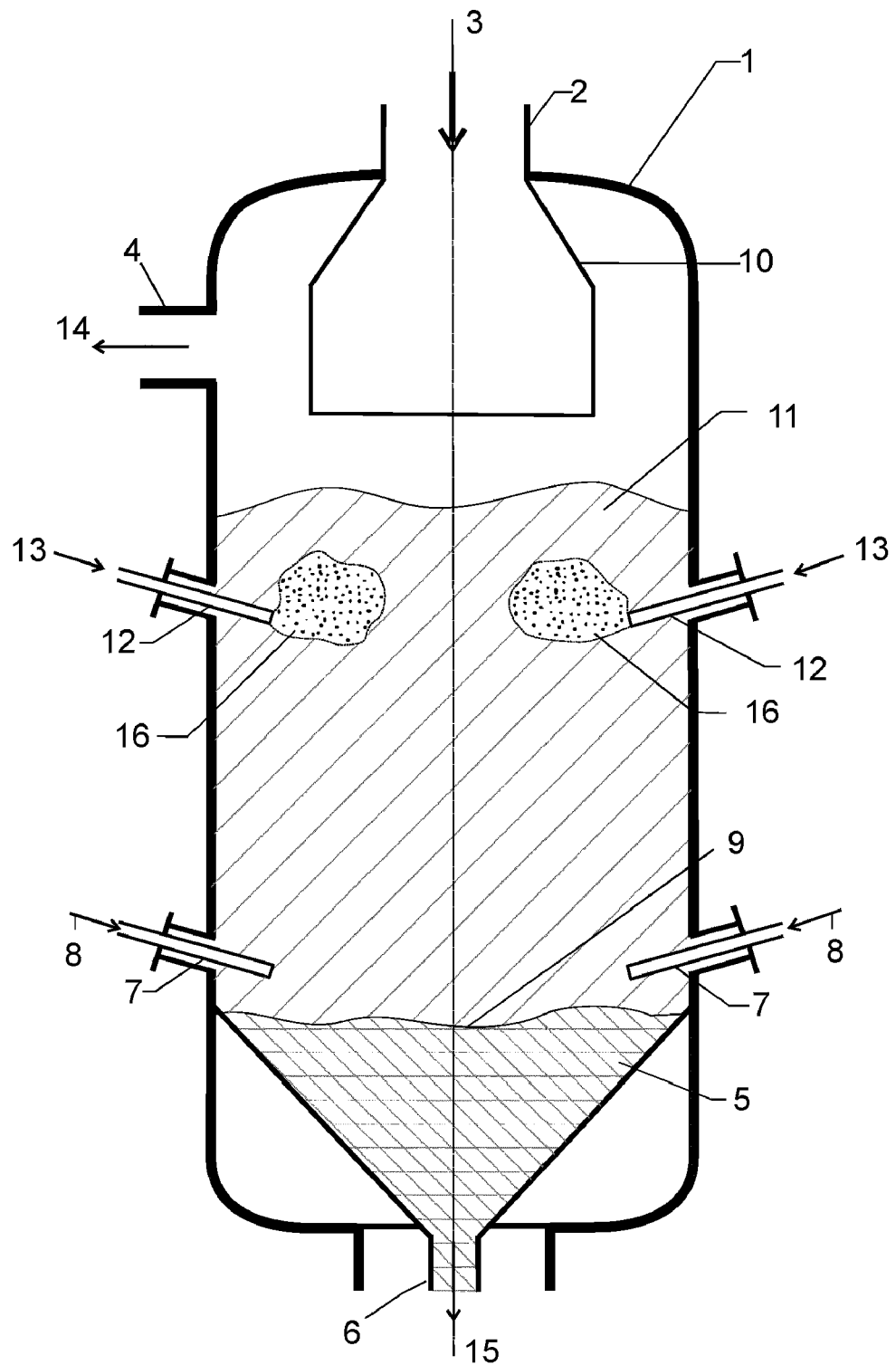

PROCESS AND APPARATUS FOR MOLTEN SLAG GASIFICATION OF SOLID FUELS

CROSS-REFERENCE TO RELATED APPLICATIONS

This application is a National Stage of International Application No. PCT/EP2013/052876, filed on Feb. 13, 2013, and published in German as WO 2013/120901 A1 on Aug. 22, 2013. This application claims the benefit and priority of German Application No. 10 2012 202 143.4, filed on Feb. 13, 2012. The entire disclosures of the above applications are incorporated herein by reference.

BACKGROUND

This section provides background information related to the present disclosure which is not necessarily prior art.

Technical Field

The method relates to a method and a device for the slag bath gasification of solid fuels in the slag bath gasifier with increased performance, a wider range of application for solid fuels and improved gas quality. The method and device according to the invention allow the gasification of coals with higher fine-grained proportions and/or additionally of fine-grained and dust-type fuels.

Discussion

The gasification of coarse-grained solid fuels, i.e. of coarse-grained coal and/or carbonaceous solids with grain sizes higher than approximately 6 mm and smaller than approximately 100 mm preferably takes place in a fixed bed according to the fixed bed high-pressure gasification method FDV or to the slag bath gasification SBV. The latter ist also known under the designation British Gas Lurgi BGL gasification. The fuels are supplied together with flow media by pressure locks overhead into the slag bath gasifier. The following zones from top to bottom are ideally constituted in the fixed bed (in fact a moving bed) that extends over the height of the slag bath gasifier: drying zone, pyrolysis zone, gasification zone, oxidation zone (blow mould) and slag bath. The slags are removed as liquid slags at the bottom of the gasifier. The gasifying agents are blown in over gasifying agent nozzles that extend into the gasifier and that are directed onto the slag bath. The raw gas vent for the raw gas that has been formed is situated on the head of the fixed bed gasifier.

The gasifying agents essentially consist of technical oxygen and vapour. The ratio between vapour and oxygen ratio (vapour/oxygen ratio) DSV, preferably indicated in the units kg vapour/m³ (S.I.), oxygen (100% vol.), ranges between 0.8 and 1.6 kg/m³ (I.S.) depending on the ash melting temperatures. Under approx. 0.8 kg/m³ (I.S.), thermal load of the gasifying agent nozzles is too high and above approx. 1.6 kg/m³ (I.S.) the ashes are no longer correctly melted.

The slag bath gasification has two general disadvantages. The first one consists in that the percentage of fine grain <6 mm to values of <approx. 5 to <approx. 20% mass percent is very limited; for non-agglomerating coal to values <approx. 5% mass percent and for agglomerating coal to values <approx. 20% mass percent. Otherwise, it comes to impairments of the good flowing of the filling and to undesirable sweeping away and discharge of dust or even to coarse-grained solids with raw gas out of the gasifier. The second disadvantage relates to the low temperatures of the dust containing raw gas flowing out of the gasifier that range between approx. 400 and 900° C. depending on the type of the fuels used. The raw gas temperatures are too low for allowing the tars formed in the pyrolysis zone and the heavy hydrocarbons to decompose. This determines on the one hand a costly gas cleaning and, on the other hand, a reduction of the synthesis gas yield of CO and $H_2$ related to the fuels used.

In order to compensate this disadvantage, it has been proposed in DE 10 2007 006 979 B4 to inject gasifying agents for the post-gasification into the free space above the fill of the fixed bed. The temperature of the raw gas should thus be increased to at least 800° C. in order to crack the heavy hydrocarbons and to convert them into synthesis gas. This solution could not be successfully achieved until now since the flame spread upwards is too big and it is to be feared that non reacting oxygen flows out of the gasifier with the raw gas. Up to now, it has not been possible to find technically more favourable solutions for the recovery of fine fuels and for improving the gas yield. A further use (generally combustion) of the coal fines has to be assured instead of gasification. However, a bigger part of the coal fines cannot be used economically and has to be disposed of as heaps.

SUMMARY OF THE INVENTION

Therefore, an aim of this invention is to develop a method for the slag bath gasification with a corresponding device that allows, with the aid of minor process and plant-related changes compared to previously known slag bath gasifiers, to increase the performance, to widen the range of applications of fuels with respect to coal with higher fine-grained percentage and/or to additionally gasify fine-grained and dust-type fuels as well as to increase the synthesis gas yield.

According to the invention, the aim is achieved by a method for the slag bath gasification of coarse-grained solid fuels with oxygen and vapour containing gasifying agents by means of a slag bath gasifier with a feeding of the coarse-grained solid fuels and with a gas vent, both on the head of the slag bath gasifier, with a slag bath and with a slag bath vent at the bottom of the slag bath gasifier, with a feeding for first gasifying agents for a non-slagging gasification by means of gasifying agent nozzles above the slag bath, with a filling of the fixed bed above the slag bath, wherein second gasifying agents are injected additionally to and independently from the first gasifying agents for a slagging gasification by at least one nozzle for gasifying agents extending into the upper area of the fixed bed filling that is situated at a vertical distance of at least 2 m above the feeding of the first gasifying agents, wherein the second oxygen containing gasifying agents are injected with vapour/oxygen ratios, the values of which range between 0.6 and 5 kg/m³ (I.S.), wherein the quantity of the injected oxygen of the second gasifying agents amounts to up to 50% of the total oxygen quantity that has been fed.

According to the invention, second gasifying agents are injected for the slagging gasification additionally and independently from the first fed gasifying agents for the non-slagging gasification, wherein the first gasification means are fed by means of gasifying agent nozzles and the second gasifying agents are injected into the upper area of the fixed bed filling by means of gasifying agent nozzles that extend into the upper area of the fixed bed filling.

The first non-slagging gasification is carried out with the first gasifying agents with the ideal-type of zone formation over the whole fixed bed (first drying zone, first pyrolisis zone, first gasification zone, first oxidation zone or first blow mould, ashes removal) and the second slagging gasification with local swirl (blow mould) formation is carried out with the second gasifying agents.

The vapour/oxygen ratios (indicated in the units kg vapour/m³ (S.I.), oxygen (100% vol.) of the second gasifying agents are adjusted either for values between 0.6 and 3 kg/m³ (I.S.) (slagging operation of the second gasification) or for values between 3 and 5 kg/m³ (I.S.) (non-slagging, sintering operation of the second gasification) or, depending on the needs, changing in one of the two value ranges.

In the slagging operation of the second gasification, liquid slags are formed in the blow moulds. In the non-slagging operation, the ashes are not molten, but sintered. The latter is advantageous if the synthesis gas yield should be improved (higher water vapour level for the cracking of hydrocarbons, in particular cracking of methane to carbon monoxide and hydrogen), the former wenn fuels with very high fine grain levels should be gasified. The forming liquid slags but also the sintered ashes avoid that flow channels are formed in the fixed bed above the second gasification from which dust or even coarse-grained solids could be swept away and discharged with the raw gas. The good flowing of the filling of the fixed bed is altogether improved.

According to an advantageous configuration of the method according to the invention, vapour is injected additionally to the second oxygen containing gasifying agents by at least one vapour nozzle.

Nozzles that supply only vapour are provided in addition to the gasifying agent nozzles for the second gasification in order to still improve the synthesis gas quality. Vapour can be additionally injected into the fixed bed with these vapour nozzles. The vapour nozzles are placed in the first gasification zone. The vapour flows into the hot carbon containing filling and reacts by forming mainly carbon monoxide and hydrogen. No blow molds are formed before the vapour nozzles, but turbulent flow zones directed upwards.

When there is blow mold formation and/or when flow zones form near walls and when they are preferably placed approximately uniformly distributed over the circumference of the fixed bed filling, the pressure losses in the filling throughflow will reduce in these wall areas. The ascending gas from below are spread in direction of the flow areas near the walls. In this way, the throughflow of the fixed bed is becoming more uniform as a whole, i.e. the mainly centered flow is changed by the second gasification to a uniformly distributed flow.

The second gasifying agents are advantageously injected into the forming first gasification zone or in case of the oxygen containing gasifying agents into the first pyrolysis zone. Temperatures of approximately 400 to 1000° C. prevail in the first pyrolysis zone and of 1100 to 1300° C. in the first gasification zone. These zones are situated in industrial-scale slag bath gasifiers at a height of 1 to 4 m above the feeding of the first gasifying agents. Accordingly, the injection of the second gasifying agents takes place at a height from 1 m above the feeding of the first gasifying agents to 1 m below the surface of the filling of the fixed bed, preferably from 2 m above the feeding of the first gasifying agents to 1 m below the surface of the filling of the fixed bed. The vertical minimal distance of 1 m from the height of the feeding of the first gasifying agents also results from the fact that it must be ensured that the oxygen of the first gasifying agents must have been fully chemically converted up to the height of the feeding of the second gasifying agents. Otherwise, the oxygen could burn out from bottom to top. Operational experiences for the slag bath gasification of mixtures of waste plastics and coal have shown that oxygen is fully chemically converted up to a height of maximally 1 m above the feeding of the first gasifying agents.

The second gasification is carried out in a limited height zone in the upper area of the filling of the fixed bed of the slag bath gasifier. The gasifying agent nozzles can be distributed over this height and over the cross-section of the fixed bed gasifier. The gasifying agents nozzles are preferably placed at a certain height and distributed over the circumference.

The injection of the second, oxygen containing gasifying agents with gas exit speeds of 20 to 120 m/s causes the formation of turbulent swirl zones (blow zones) as hollow spaces in the fixed bed filling before the outlet openings of the gasifying agent nozzles in which carbon burns with oxygen (second combustion zones). The swirl zones before the nozzles are wrapped by a filling of coke in which the endothermic reactions react by temperature reduction, if necessary with a chemical transformation of the water vapour of the second gasification (second gasification zones). The molten or sintered ashes quickly cool down in the surrounding colder coke filling and solidify. They give off heat to the endothermic second gasification processes. The forming of classical layered-type zones does not take place with the second gasification.

The injection of vapour as a second gasifying agent by means of vapour nozzles also takes place with gas exit speeds of 20 to 120 m/s.

It is advantageous if the second gasification is carried out in the first gasification zone. It is ensured here that degassed coke is available at high temperatures (higher conversion with water vapour and higher cold gas efficiency compared to reactions with pyrolysing coal). In the case of the slagging operation with oxygen containing gasifying agents, the temperatures around the gasifying agent nozzles penetrating into the fixed bed filling of the first gasification zone of approximately 1100 to 1300° C. are so high that the slags only partially solidify. Slags adhering to the gasifying agent nozzles detach from the filling moving downwards and are further conveyed.

According to a further embodiment of the method according to the invention, it is advantageous if the second gasification is carried out with oxygen containing gasifying agents in the first pirolysis zone. In this case, a stronger partial combustion of the gases ascending before the gasifying agent nozzles takes place so that the temperatures of the gases coming out upwards from the fixed bed filling raise more so that a stronger cracking of methane and of the heavy hydrocarbons takes place.

It is particularly advantageous that the ashes released in the second gasification with oxygen containing gasifying agents immediately sinter or melt and eliminate a channel formation since a channel-like "burning out" of oxygen by the filling is prevented due to immediate slag or sinter formation. Initially forming channels or channels that originate from the first gasification are also quickly "closed" with slag formation. For this reason, the swirl zones cannot detach upwards or only at a limited extent from the gasifying agent nozzles, but meander at an approximately constant height before or above the gasifying agent nozzles. The second gasification is thus locally limited according to the arrangement of the outlet openings of the gasifying agent nozzles and its height is defined. The meandering gas flow and the forming slags stabilize the fixed bed in the environment of and above the gasifying agent nozzles so that the regular throughflow of the fixed bed is maintained in spite of higher flow rates.

The second gasification leads to an uniformization of the throughflow of the whole fixed bed. The fine grain proportions of the coarse-grained fuels used can be increased without the discharge of dust with the raw gas being increased. The lower grain sizes of the coarse-grained solid fuels can be reduced from approximately 6 mm to approximately 2 mm.

The fuels used can have substantially finer grains by maintaining the performance of the slag bath gasifier measured with the quantity of oxygen fed in $m^3$ (I.S.)/h. This results from the fact that, for example, only 80% of the oxygen are fed as first oxygen and 20% as second oxygen, i.e. the flow rates of the gases are reduced accordingly by approximately 20% in the main level range of the filling up to the second gasification and raised to approximately 100% only above the second gasification.

According to an advantageous embodiment of the method according to the invention, fine-grained and/or dust-type fuels can additionally be added in the swirl zones (blow zones) that form before the gasifying agent nozzles.

A further substantial advantage of the second gasification consists in that in particular the fine-grained and dust-type parts of the fuels can be gasified with a coarsening of the ashes/slag particles. The cooled solidified slags or sinter contribute to the coarsening of the grain size in the whole fixed bed and further to the "intermeshing" stabilization of the fixed bed over the entire height. Local accumulations of fine grains and dust that cause the eruption-like throughflow of the filling and are one of the main causes for high dust discharge are suppressed or reduced. The fine grain percentages of the fuels used can be increased without the discharge of dust with the raw gas being increased. The percentage of the dust-type fuels that are introduced into the gasifier with the coarse-grained solid fuels can also be increased. Fine-grained and/or dust-type fuels (fine fuels) that otherwise have to be used in another way or that have to be disposed of can be utilized in bigger quantities additionally to the coarse-grained fuels by means of the second gasification.

Altogether the synthesis gas yield (carbon monoxide and hydrogen) is increased since the increased water vapour percentage that comes from the water of the drying, from the reaction water of the pyrolysis and from the water vapour of the second gasifying agents reacts with methane and the heavy hydrocarbons in the upper area of the filling.

An essential goal of the second gasification, to improve the gas quality (lower methane and tar content as well as higher synthesis gas yields of CO and $H^2$), is achieved when such a quantity of second oxygen containing gasifying agents is fed that the gas exit temperatures of the raw gas increase to temperatures of 850° C. and more. From this temperature, the quick gasification reactions of water vapour with the hydrocarbons take place with formation of carbon monoxide and hydrogen. The methane and tar content is reducing and the hydrogen and carbon monoxide percentage in the raw gas is considerably increased so that the gas quality is improved.

When fuels with low fine-grain and dust percentages are gasified, the gasification performance can be increased up to 30% by means of the second gasification.

The second gasification does not improve only the fuel tolerance to higher percentages of fine grains and dust of the fuels or enables the additional introduction of fine fuels, but also increases the fuel tolerance to agglomerating coal that could not be gasified without using a stirrer. The second combustion zones with their quick temperature increases and high temperatures reduce the tendency of the coal to agglomerate and break up already formed coke composites. In many cases, due to the second gasification, the use of a stirrer is not necessary.

The gasifying agent nozzles are designed as nozzles for water-cooled gasifying agent mixtures or as cooled single-medium nozzles. They can be cranked (cranked nozzles) as well as not cranked (tubular nozzles), whereby the cranked nozzle head is situated for the cranked nozzles on the tubular nozzle head.

The gasifying agent nozzles and the vapour nozzles are put through the cylindrical outer jacket or the double jacket of the slag bath gasifier. The non cranked gasifying agent and vapour nozzles are oriented radially and horizontally or can be adjusted differently from the radial and horizontal orientation with setting angles of <45° in all directions. The nozzles are preferably oriented radially and inclined downwards with an angle of 15° with a horizontal plane. This proves to be advantageous with respect to the avoidance of the penetration of solids into the inner space of the nozzles and to the blow mold formation and the turbulent flow zones. In case of the use of cranked gasifying agent nozzles or vapour nozzles, the nozzle flanges are approximately horizontal and the nozzle heads are oriented similarly to the setting angle of the tubular nozzles indicated above.

A further embodiment consists in that a shortest possible height zone with a vertical extension of <1 m is selected for the second gasification zone in the upper half of the first gasification zone below the pyrolysis zone so that the first gasification zone is uniformly extended upwards over the cross-section.

In the case that the height of the filling of the fixed bed changes during the operation of the fixed bed gasifier between a maximal and a minimal level and the difference is more than 1 m, it is advantageous if alternatively two height zones of the fixed bed gasifier are provided with gasifying agent nozzles, the lower height zone for the minimal level and the upper height zone for the maximal level of the fixed bed. The vertical minimal distance of the two height zones is more than 1 m. It must then be technically provided that the two height zones are selectively exposed to gasifying agents.

The gasifying agent nozzles and the vapour nozzles extend with at least 10 cm free length (free nozzle length) into the gasification space of the fixed bed gasifier. The nozzles in proximity of the walls preferably extend at a depth of approximately 20 cm to 1 m into the gasification space of the fixed bed gasifier. For a bigger free nozzle length up to approximately 3 m, the nozzles are held on the top with tie rods.

In order to form locally separated swirl and flow zones, the lateral horizontal distance between the outlet openings of the nozzles should not be lower than 50 cm. The lateral horizontal distance between the outlet openings preferably is 1 to 2 m.

The proportions of second and first oxygen can be varied within wide limits. In the case of the formation of a second gasification zone over the whole cross-section of the fixed bed gasifier and of the additional gasification of fine fuels, up to 50 mass percent of the whole oxygen can be fed as second oxygen. The lower the ash content of the fuels used, the higher the proportion of second oxygen to be achieved.

The size of the slag pieces forming in the blow moulds before the single gasifying agent nozzles is limited in that the oxygen accumulations in the single gasifying agent nozzles can be varied between minimal and maximal load. This being, the total quantity of oxygen of the second gasifying agents can be kept constant by varying the load distribution between the single nozzles, or the total quantity of oxygen can also be varied in time.

The thermal performances of the fixed bed gasifier are increased approximately proportionally to the proportions of second oxygen additionally injected to the first oxygen. This being, it is of subordinate importance that the fuel throughput is increased or that additional fine fuels are injected. Higher amounts of fine-grained fuels and fine fuels can be gasified together with the coarse-grained fuels or additionally to the coarsed-grained fuels. The fuel spectrum can also be widened in direction more agglomerating hard coal without the use of a stirrer being necessary. The limits of performance of the thermal gasifier performance is increased due to the improved flow conditions of the fixed bed filling.

The temperatures of the raw gas coming out of the slag bath gasifier also increase according to the proportions of second oxygen additionally injected to the first oxygen. The gas temperature can purposefully be increased by 100 up to 300 K. A goal-oriented and variably adjustable conditioning of the raw gas quality according to the requirements of the gas utilisation (low methane containing or higher methane containing synthesis gases) is given hereby.

The invention also relates to a slag bath gasifier for the gasification of solid fuels with oxygen and water vapour containing gasifying agents with a feeding of the coarse-grained solid fuels and with a raw gas vent, both on the head of the slag bath gasifier, with a slag bath and with a slag bath vent at the bottom of the slag bath gasifier, with a feeding for first gasifying agents by means of gasifying agent nozzles above the slag bath, with a filling of the fixed bed above the slag bath, whereby the slag bath gasifier has at the level of the upper area of the fixed bed filling at least one gasifying agent nozzle extending into the upper area for the feeding of second oxygen containing gasifiying agents, this nozzle being situated at a vertical distance of at least 2 m above the feeding of the first gasifying agents, whereby the at least one gasifying agent nozzle is configured in such a manner that it allows the injection of second oxygen containing gasifying agents with vapour/oxygen ratios between 0.6 and 5 kg/m$^3$ (I.S.) and that the quantity of the injected oxygen of the second gasifying agents amounts to up to 50% of the total quantity of fed oxygen.

The at least one gasifying agent nozzle is situated at a vertical distance of at least 2 m above the feeding of the first gasifying agents.

According to an advantageous configuration of the slag bath gasifier according to the invention, the slag bath gasifier has vapour nozzles for the additional feeding of vapour additionally to the gasifying agent nozzles for the second oxygen containing gasifying agents.

The slag bath gasifier advantageously has several gasifying nozzles for the second oxygen containing gasifying agents or vapour nozzles for vapour that are placed in one or two planes.

The plant-related technical configuration of the second gasification is simple, robust and requires only slight equipment-related adaptations of the known and proven slag bath gasifier. They relate to the penetration sockets for the gasifying agent and vapour nozzles and, if need be, the feed sockets for the fine fuels. It proves to be particularly advantageous that the second gasification can be gradually (beginning with one gasifying agent nozzle) to completely (with a complete set of gasifying agent and vapour nozzles) installed, upgraded and operated in existing slag bath gasification plants or partially operated according to the requirements or taken out of service or reverted to the original.

EMBODIMENT

An embodiment of the invention shall be further explained by reference to the annexed illustrations.

FIG. 1 shows the schema of a simplified representation of a slag bath gasifier.

An inlet 2 for coarse-grained solid fuels (3) as well as a raw gas outlet (4) are situated on the head of the slag bath gasifier 1. A slag bath 5 is placed at the bottom of the slag bath gasifier 1, whereby a slag tapping nozzle 6 by which the slag 15 is removed is situated at the lower end of the slag bath. Six gasifying agent nozzles 7 with which the first gasifying agents 8 are injected in direction of the surface 9 of the slag bath 5 are situated at a slight distance over the surface of the slag bath. The gasifying agent nozzles 8 are uniformly distributed over the circumference of the slag bath gasifier 1.

The fuel inlet (2) opens out in the upper part of the fixed bed gasifier into a hanging pit (10).

The free inner diameter of the slag bath gasifier (1) is 4 m and the average height of the filling of the fixed bed (11) is 6 m, this being calculated from the height of the inlet 2 of the first gasifying agents 8.

Ten gasifying agent nozzles (12) in total for the feed of the second oxygen containing gasifying agents (13) at a height of 3 m over the inlet of the first gasifying agents 8 are placed uniformly distributed over the circumference of the slag bath gasifier (1). The gasifying agent nozzles (2) are designed as radially oriented tubular nozzles that are inclined downwards with an angle of 15° with a horizontal plane. They protrude with 30 cm into the filling of the fixed bed (11).

The slag bath gasifier constructed in that way is operated as follows.

60 t/h non-agglomerating coarse-grained fuels (3) as hard coal (2) with an ash content of approximately 20 mass percent (in dry matter), a water content of approximately 5 mass percent (in dry matter), an ash melting point of approximately 1400° C. and a grain size of approximately 5 to 100 mm shall be gasified at a total pressure of approximately 30 bar. The fuels 3 are fed into the slag bath gasifier (1) from the top. The raw gas (14) leaves the slag bath gasifier (1) through the raw gas outlet (4) while the slag (15) is removed at the bottom. The quantity of the first oxygen amounts to 12000 Nm$^3$/h (based on pure oxygen), the average vapour/oxygen ratio of the first gasifying agent is approximately 0.9 kg/m$^3$ (I.S.). The temperature of the raw gas 14 is 500° C.

According to the invention, the second gasification is carried out for the slag bath gasifier 1 with oxygen containing second gasifiying agents.

The quantity of second oxygen of the second oxygen containing gasifying agents (13) amounts to a total of 2500 to 3600 m$^3$ (I.S.)/h (based on pure oxygen), the vapour/oxygen ratio to 2 kg/m$^3$ (I.S.).

The second oxygen containing gasifying agents 13 are uniformly distributed over the gasifying agent nozzles (12) and blown into the fixed bed 11. The second oxygen containing gasifying agents flow with flow rates of 70 m/s into the fixed bed 11. Blow moulds (16) form before the gasifying agent nozzles 12.

The quantity of the second gasifying agents 13 is adjusted in such a manner that the raw gas temperature is increased from 500° C. to 900° C. so that the gas quality is increased. Moreover, the synthesis gas performance is increased much more than correspondingly to the increase of the oxygen quantity since methane and tar are converted and mainly hydrogen and carbon monoxide are formed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for the slag bath gasification of solid fuels with oxygen and water vapour containing gasifying agents,
the method being conducted by means of a slag bath gasifier with a feed of coarse-grained solid fuels and with a gas vent, both on the head of the slag bath gasifier, with a slag bath and with a slag bath vent at the bottom of the slag bath gasifier, with a feed for first oxygen and water vapour containing gasifying agents by means of gasifying agent nozzles above the slag bath, with a filling of a fixed bed above the slag bath,
wherein second oxygen and water vapour containing gasifying agents are injected additionally to the first gasifying agents by at least one gasifying agent nozzle extending into the upper area of the fixed bed filling that is situated at a vertical distance of at least 2 m above the feed of the first gasifying agents,
wherein the second oxygen and water vapour containing gasifying agents are injected with vapour/oxygen ratios, the values of which range between 0.6 and 5 $kg/m^3$ (I.S.),
wherein the second oxygen and water vapour containing gasifying agents are injected with flow rates of at least 20 and maximally 120 m/s into the filling of the fixed bed so that turbulent swirl zones form as hollow spaces in the fixed bed filling before the outlet openings of the gasifying agent nozzles in which carbon burns with oxygen and the released ashes melt or sinter,
and wherein the quantity of the injected oxygen of the second gasifying agents amounts to up to 50% of the total oxygen quantity that has been fed.

2. The method according to claim 1, wherein vapour is injected by at least one vapour nozzle additionally to the second oxygen containing gasifying agents.

3. The method according to claim 1, wherein the second oxygen containing gasifying agents and/or the vapour is injected into the fixed bed filling with flow rates of at least 20 and maximally 120 m/s.

4. The method according to claim 1, wherein coarse-grained solid fuels with a grain size higher than 2 mm are fed into the slag bath gasifier.

5. The method according to claim 1, wherein fine-grained and/or dust-type fuels are additionally added into the swirl zones forming in front of the gasifying agent nozzles.

* * * * *